T. J. VAN PELT.
AUTOMOBILE CARRIAGE.
APPLICATION FILED JUNE 19, 1908.
933,007.
Patented Aug. 31, 1909.
2 SHEETS—SHEET 1.
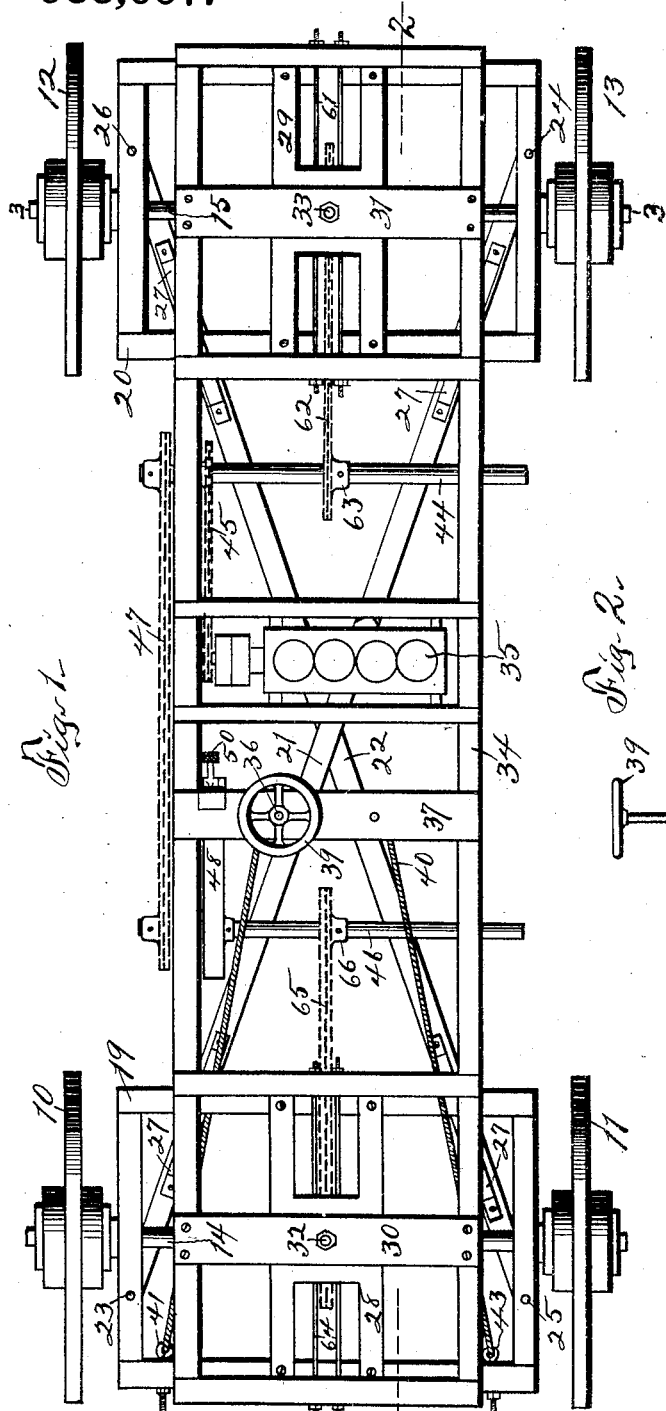
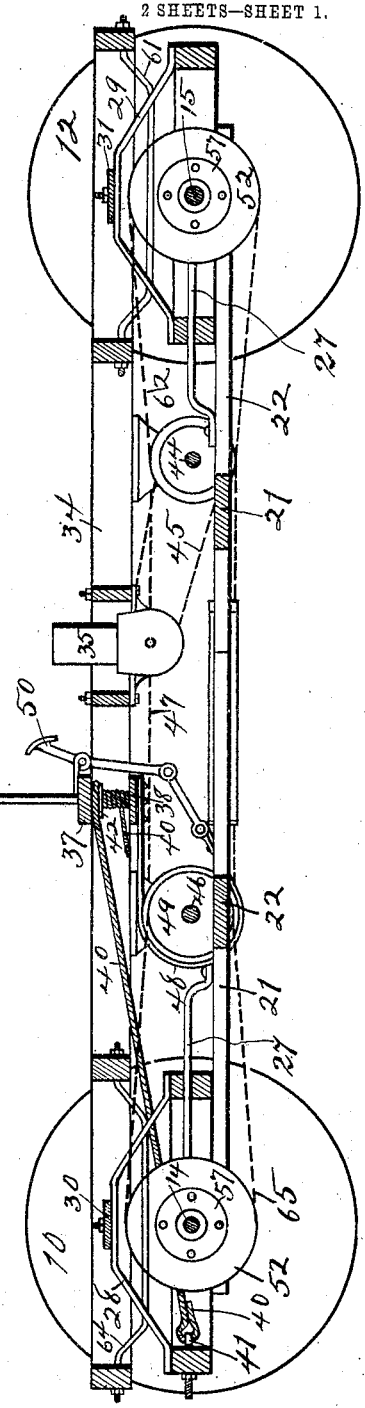

T. J. VAN PELT.
AUTOMOBILE CARRIAGE.
APPLICATION FILED JUNE 19, 1908.
933,007.
Patented Aug. 31, 1909.
2 SHEETS—SHEET 2.
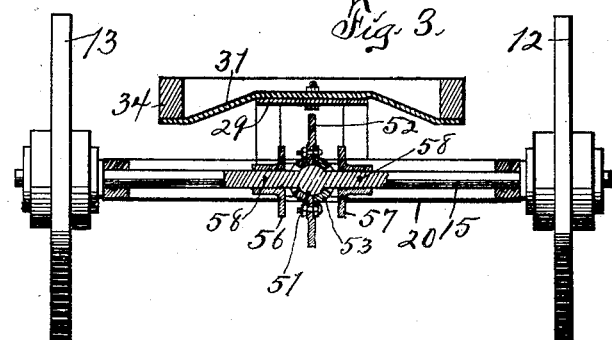
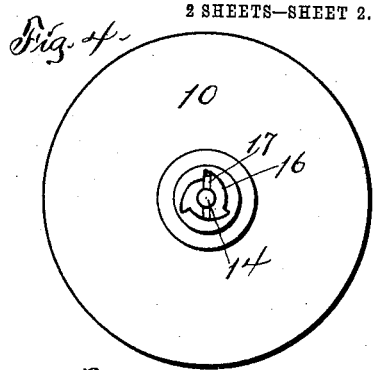
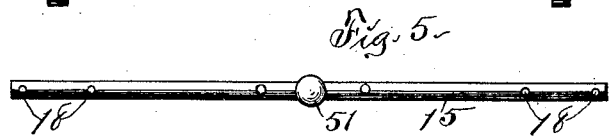
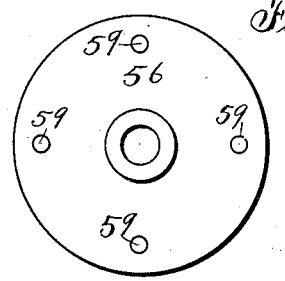
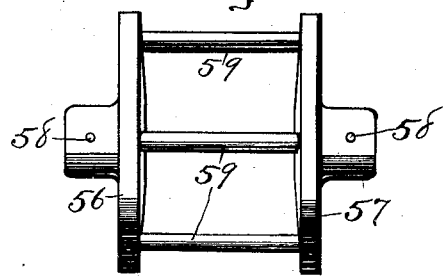
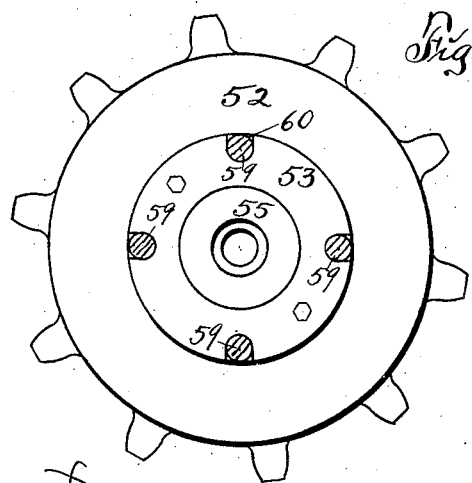
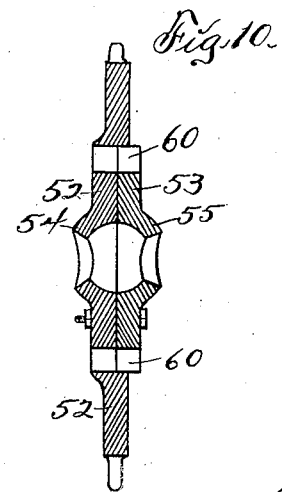
Witnesses:
Inventor: Thomas J. Van Pelt,
By Thomas G. Orwig & Co.
Attorneys.

UNITED STATES PATENT OFFICE.

THOMAS J. VAN PELT, OF STATE CENTER, IOWA.

AUTOMOBILE CARRIAGE.

931,007.

Specification of Letters Patent.   Patented Aug. 31, 1909.

Application filed June 19, 1908.   Serial No. 439,461.

*To all whom it may concern:*

Be it known that I, THOMAS J. VAN PELT, a citizen of the United States, residing at State Center, in the county of Marshall and State of Iowa, have invented a new and useful Automobile Carriage, of which the following is a specification.

The object of this invention is to provide means for applying power to all of the supporting and traction wheels of a vehicle simultaneously.

My invention consists in the construction, arrangement and combination of elements hereinafter set forth, pointed out in my claims and illustrated by the accompanying drawing, in which—

Figure 1 is a plan of a wheel carriage embodying my invention. Fig. 2 is a longitudinal vertical section of the same. Fig. 3 is a cross-section on the indicated line 3—3 of Fig. 1. Fig. 4 is a detail elevation showing the means employed to connect one of the wheels to the axle. Fig. 5 is a side elevation of an axle and Fig. 6 is an end elevation of the same. Fig. 7 is an end elevation and Fig. 8 is a side elevation of a frame employed to connect an axle to the sprocket gear. Fig. 9 is an elevation and Fig. 10 is a vertical section of a sprocket gearing employed in the machine.

In the construction of the machine as shown the numerals 10, 11 designate front wheels and 12, 13 designate rear wheels which may be of any desired construction and be provided with tires of any desired form or character. All of the wheels are of the same construction and a single description is applicable to each.

The numerals 14, 15 designate axles which are alike in construction and preferably made of metal, cylindrical in general form. Each wheel, such as 10, is formed with a skein or central bearing adapted to admit one end of an axle. Each wheel is formed with internal inclined teeth 16 in each end of its hub and the teeth in one end are arranged opposite to the teeth in the other end. Pins 17 are loosely mounted in holes 18 (two in number in each end of each axle) and are adapted to move freely transversely of said axle. End portions of the pin 17 engage the teeth 16 in the hubs of the wheels. Thus when the axle is moved in one direction rotatively two of the pins thereon engage the teeth 16 at one end of each hub for instance, and when the movement of the axle is reversed the other two pins engage the other teeth and move the wheels in the opposite direction.

Rectangular frames 19, 20 are mounted on the axles 14, 15 by means of bearings in the ends of said frames through which bearings said axles are mounted for rotation. Steering bars 21, 22 are arranged in a plane beneath the frames 19, 20 and cross each other at their centers midway between the axles 14, 15. The steering bar 21 is pivoted at one end to one end portion of the frame 19 by means of a bolt 23 and is pivoted at its opposite end to the opposite end of the frame 20 by a bolt 24. The steering bar 22 is pivoted at its forward end to the end of the frame 19 opposite to the bolt 23 by a bolt 25 and the opposite end of said steering bar is pivoted to the end of the frame 20 opposite the bolt 24 by a bolt 26. The points of pivotal attachment of the steering bars 21, 22 to the frame 19 are in advance of the axle 14 and the points of pivotal attachment of said steering bars to the frame 20 are at the rear of the axle 15. Keepers 27 are mounted on the steering bars 21, 22 and arch over and slidingly connect with the innermost cross bars of the frames 19, 20. Arches 28, 29 are mounted on the frames 19, 20 and arches 30, 31 are arranged transversely of the first arches and are connected thereto by kingbolts 32, 33.

A carriage frame 34 is mounted on and supported by the extremities of the arches 30, 31 and a motor 35 is mounted on and carried by the central portion of said carriage frame. A steering shaft 36 is mounted vertically and stepped for rotation in parallel cross-bars 37, 38 on the central portion of the carriage frame 34 and is provided with a hand wheel 39 on its upper end whereby it may be rotated in either direction. A drum is formed on the steering shaft 36 between the cross bars 37, 38 and a central portion of a cable 40 is fixed to and wound on said drum. The cable 40 extends obliquely from the drum on the steering shaft 36 to a point of attachment such as an eye-bolt 41 in one end portion of the frame 19 adjacent the bolt 23. The cable 40 extends laterally between the cross-bars 37, 38 to and around a guide sheave 42 and thence obliquely to a point of attachment such as an eye-bolt 43 in the end portion of the frame 19 adjacent the bolt 25. The eye-bolts 41, 43 and nuts thereon may be employed to determine and adjust the tension of the cable 40. A shaft 44 is mounted for rotation in bearings on the carriage frame 34 and is arranged parallel with the shaft of the motor 35. Sprocket gearing 45 connects the shaft 44 to the motor shaft. A shaft 46 is mounted for rotation in bearings on the carriage frame 34 and is arranged parallel with the motor shaft. Sprocket gearing 47 connects the shafts 44 and 46.

A band brake 48 is mounted on the carriage frame 34 and extends around and engages a brake disk 49 on the shaft 46. The band brake 48 is connected to and operated by a pedally operated brake lever 50 fulcrumed on the cross-bar 37 adjacent the steering shaft 36. A ball or spherical boss 51 is formed on the central portion of the axle 15 and a sprocket wheel formed of mating members 52, 53 is mounted loosely on said axle and is formed with concavo-convex hub members 54, 55 loosely embracing and engaging said ball. The sprocket wheel may oscillate on the ball 51. A frame is provided and is constructed of heads 56, 57 mounted on the axle 15 on opposite sides of the sprocket wheel thereon and adapted to be secured to said axle rigidly by pins 58 extending through the hubs of the heads and through said axle. The heads 56, 57 are connected by cross-bars 59 which extend loosely through holes 60 in the sprocket wheel members 52, 53. The sprocket wheel may oscillate within the frame because the holes 60 are materially larger than the diameter of the cross-bars 59. Rods 61 are mounted longitudinally of the carriage frame 34 on opposite sides of the sprocket wheel to limit oscillation of said sprocket wheel on a horizontal axis, because of the location of said rods above the frame heads 56, 57. A sprocket chain 62 connects the sprocket wheel on the axle 15 to a sprocket wheel 63 rigidly mounted on the shaft 44. The axle 14 is provided with a central boss or ball, a sprocket wheel thereon, a frame engaging said sprocket wheel and rods 64 identical with those described in connection with axle 15. A chain 65 connects the sprocket wheel of the axle 14 to a sprocket wheel on the shaft 46.

In the practical operation of this machine any movement of rotation of the steering shaft 36 is communicated simultaneously to and results in a movement of oscillation of the wheels 10, 11, 12 and 13 through the medium of the cable 40, frames 19, 20 and the steering bars 21, 22 to the end of turning the supporting and traction wheels on vertical axes in such manner as to change the direction of travel of the carriage. If the motor 35 is reversible it follows that the forward or rearward travel of the supporting and traction wheels is dependent on the direction of rotation of the motor shaft. Provision of a band brake in the driving mechanism insures the application of the braking influence simultaneously to all four of the wheels of the carriage. The movement of oscillation between the sprocket wheels and the axles on which they are mounted is provided in order that desired alinement of the sprocket gearing may be maintained irrespective of oscillation of the frames 19, 20 and axles therein and the rods 61 and 64 arranged as described serve to maintain such alinement in respect of the main frame 34.

I claim as my invention—

1. An automobile carriage, comprising wheeled trucks formed with horizontal slots in their inner ends, arches on said trucks, arches crossing and pivoted to the first arches, a frame fixed to the latter arches, steering bars crossing each other between and pivoted at their ends to said trucks, keepers on said steering bars extending loosely through the slots of the trucks, and driving mechanism carried on said frame and geared to said trucks.

2. An automobile carriage, comprising frames, arches crossing said frames, arches crossing and pivoted to the first arches, steering bars connecting said frames pivotally and crossing each other between the frames, keepers on said steering bars slidingly engaging portions of said frames, axles in said frames, wheels supporting said axles, a carriage frame rigidly mounted on the latter arches, and driving mechanism on the carriage frame geared to both of said axles.

3. An automobile, comprising wheels, axles carried by said wheels, frames journaled on said axles, crossed steering bars pivotally connected to said frames, keepers on said bars slidingly engaging said frames, arches on said frames, arches crossing and pivoted to the first arches, a carriage frame mounted rigidly on the latter arches, steering mechanism on the carriage frame and connected to one of the first frames, driving mechanism on the carriage frame and gear connections between said driving mechanism and both of the axles.

4. An automobile, comprising a carriage frame, a plurality of trucks pivoted thereto and adapted to oscillate on vertical axes, said trucks formed with slots horizontally arranged in their inner ends, crossed bars between said trucks, pivotal connections between the extremities of said bars and the trucks in front of the forward axle and at the rear of the rear axle thereof, sliding connections between said crossed bars and the trucks, said sliding connections comprising keepers fixed to and arching above the crossed bars and extending through said slots in the trucks, together with steering devices and driving mechanism carried on the carriage frame and geared to the trucks.

5. In an automobile a traction axle formed with a ball intermediate of its ends, a sprocket wheel formed of mating members each provided with a seat adapted to engage said ball, frame heads rigidly mounted on said axle on opposite sides of the sprocket wheel and bars on said frame heads extending loosely and slidingly through said sprocket wheel, whereby said sprocket wheel may oscillate on said ball.

6. An automobile carriage comprising wheels, axles carried by said wheels, frames journaled on said axles, said frames formed with horizontal slots in their inner ends, crossed steering bars pivotally connected to said frames at points in front of the forward axle and at the rear of the rear axle, keepers mounted on said bars and extending through said slots, a steering drum, a cable having its bight wound on said drum and fixed at its ends to forward corners of the forward frame, arches on said frames, arches crossing and pivoted to the first arches, a carriage frame rigidly mounted on the latter arches, driving mechanism on the carriage frame, and gear connections between said driving mechanism and both of said axles.

THOMAS J. VAN PELT.

Witnesses:
G. W. HOIT,
J. GUTEKUNST.